(12) United States Patent
Li et al.

(10) Patent No.: US 7,272,108 B2
(45) Date of Patent: Sep. 18, 2007

(54) CHANNEL ESTIMATION IN ORTHOGONAL FREQUENCY-DIVISION MULTIPLEXING (OFDM) SYSTEMS

(75) Inventors: Kuo Hui Li, Hsinchu (TW); Charles Huang, Hsinchu (TW); Mao-Ching Chiu, Hsinchu (TW); Hung-Kun Chen, Hsinchu (TW); Chao-Ming Chang, Hsinchu (TW)

(73) Assignee: Mediatek, Inc., Hsin-Chu (TW)

( * ) Notice: Subject to any disclaimer, the term of this patent is extended or adjusted under 35 U.S.C. 154(b) by 1046 days.

(21) Appl. No.: 10/308,513

(22) Filed: Dec. 3, 2002

(65) Prior Publication Data

US 2004/0022174 A1    Feb. 5, 2004

Related U.S. Application Data

(60) Provisional application No. 60/400,888, filed on Aug. 1, 2002.

(51) Int. Cl.
*H04J 11/00* (2006.01)
*H04K 1/10* (2006.01)
*H04B 7/10* (2006.01)

(52) U.S. Cl. ............... 370/203; 370/208; 75/260; 75/267; 75/347

(58) Field of Classification Search ........... 370/203, 370/208; 375/260, 267, 347
See application file for complete search history.

(56) References Cited

U.S. PATENT DOCUMENTS

| | | | |
|---|---|---|---|
| 5,303,263 A * | 4/1994 | Shoji et al. | 375/229 |
| 5,481,572 A * | 1/1996 | Skold et al. | 375/347 |
| 6,185,258 B1 | 2/2001 | Alamouti et al. | 375/260 |
| 6,449,314 B1 * | 9/2002 | Dabak et al. | 375/267 |
| 6,507,604 B1 * | 1/2003 | Kuo | 375/148 |
| 6,611,551 B1 * | 8/2003 | Jones et al. | 375/219 |
| 6,707,856 B1 * | 3/2004 | Gardner et al. | 375/260 |
| 6,775,329 B2 * | 8/2004 | Alamouti et al. | 375/267 |
| 6,850,481 B2 * | 2/2005 | Wu et al. | 370/208 |
| 6,885,708 B2 * | 4/2005 | Thomas et al. | 375/260 |
| 6,959,047 B1 * | 10/2005 | Al-Dhahir et al. | 375/267 |
| 7,120,200 B2 * | 10/2006 | Alamouti et al. | 375/267 |
| 2002/0044524 A1 * | 4/2002 | Laroia et al. | 370/203 |
| 2003/0072452 A1 * | 4/2003 | Mody et al. | 380/274 |
| 2003/0128751 A1 * | 7/2003 | Vandenameele-Lepla | 375/229 |
| 2004/0005010 A1 * | 1/2004 | He et al. | 375/260 |

OTHER PUBLICATIONS

OFDM Wireless LANs: A Theoretical and Practical Guide Terry, et al.
A Simple Transmit Diversity Technique for Wireless Communications Alamouti; Oct. 1998.

(Continued)

*Primary Examiner*—Alpus H. Hsu
(74) *Attorney, Agent, or Firm*—Thomas, Kayden, Horstemeyer & Risley

(57) ABSTRACT

A system and method for estimating channel characteristics in orthogonal frequency-division multiplexing (OFDM) systems with transmitter diversity is presented. The disclosed approach is compatible with the Institute of Electrical and Electronics Engineers (IEEE) "Wireless Local Area Network (LAN) Medium Access Control (MAC) and Physical Layer (PHY) Specification." In the disclosed system and method, an additional training symbol is transmitted during the data period. This provides additional information that may be used to more accurately estimate channel characteristics.

10 Claims, 6 Drawing Sheets

OTHER PUBLICATIONS

Transmitter Diversity for OFDM Systems and Its Impact on High-Rate Data Wireless Networks Li, et al.; Jul. 1999.

Part 11: Wireless LAN Medium Access Control (MAC) and Physical Layer (PHY) specifications: High-Speed Physical Layer in the 5 GHZ Band IEEE Computer Society; Sep. 1999.

Part 11: Wireless LAN Medium Access Control (MAC) and Physical Layer (PHY) specifications: High-Speed Physical Layer in the 2.4 GHZ Band IEEE Computer Society; Sep. 1999.

Part 11: Wireless LAN Medium Access Control (MAC) and Physical Layer (PHY) specifications: High-Speed Physical Layer in the 5 GHZ Band IEEE Computer Society; Nov. 1999.

A Space-Time Coded Transmitter Diversity Technique for Frequency Selective Fading Channels Lee, et al.; 2000.

Summary of Properties of the Discrete Fourier Transform Jul. 2002.

* cited by examiner

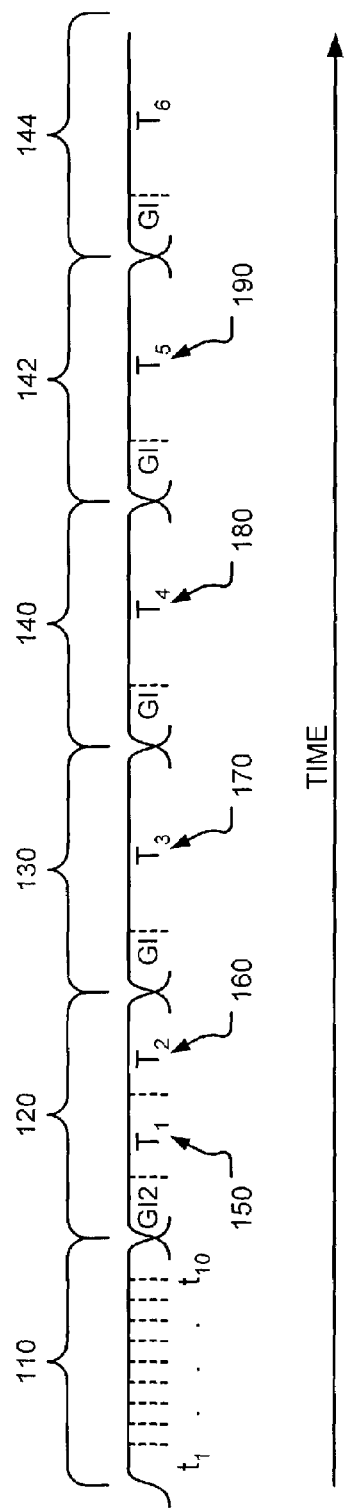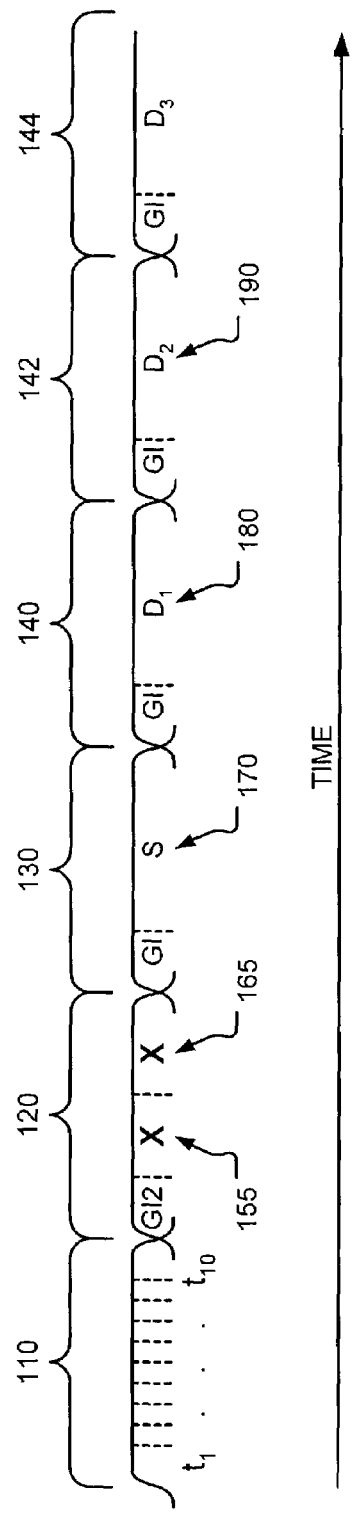

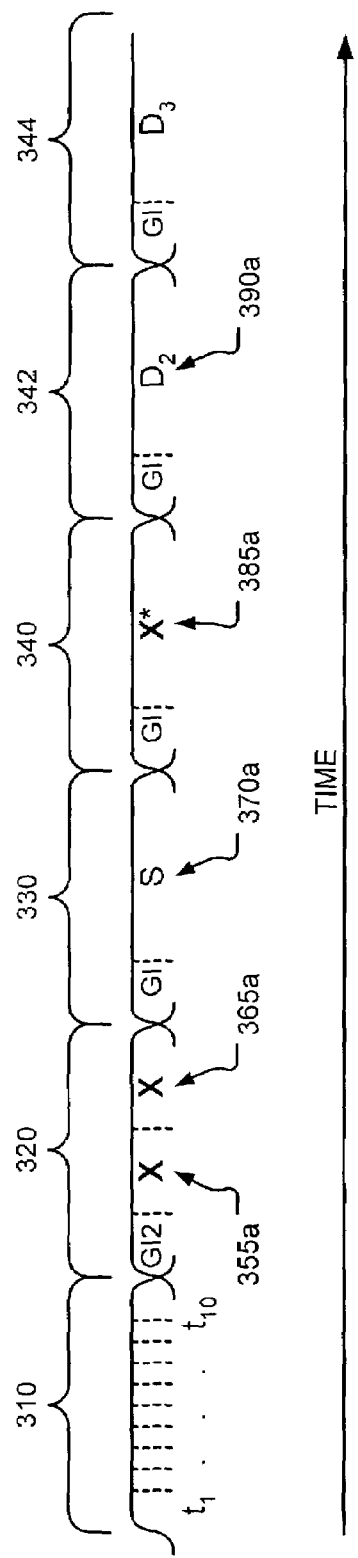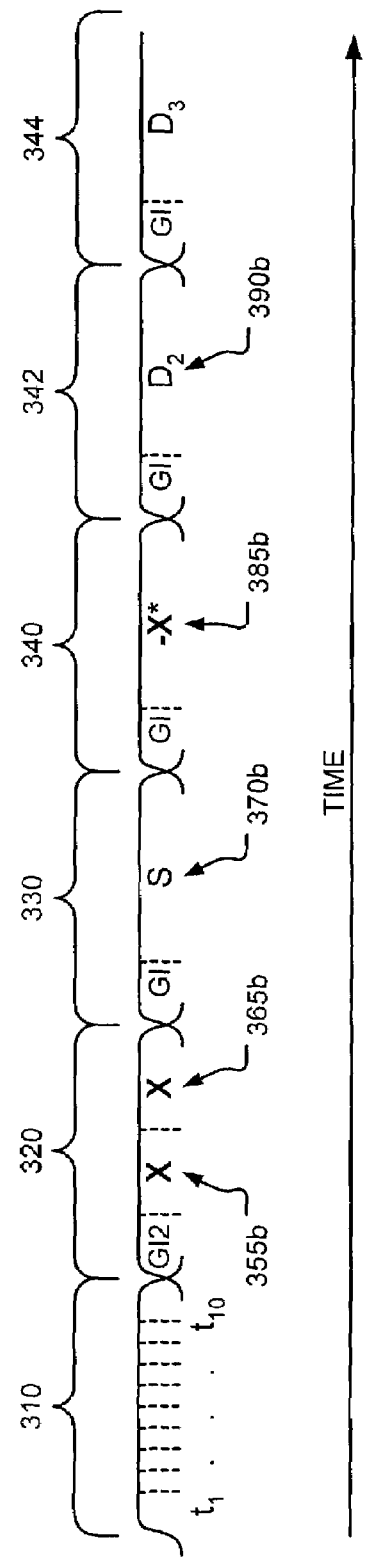

CHANNEL ESTIMATION IN ORTHOGONAL FREQUENCY-DIVISION MULTIPLEXING (OFDM) SYSTEMS

CROSS REFERENCE TO RELATED APPLICATIONS

This application claims the benefit of U.S. provisional patent application serial No. 60/400,888, filed Aug. 1, 2002, which is incorporated herein by reference in its entirety.

FIELD OF INVENTION

The present invention is directed to communication systems and, more particularly, to systems and methods for estimating channel characteristics in orthogonal frequency-division multiplexing (OFDM) systems with transmitter diversity.

BACKGROUND

Radio-frequency local area network (LAN) systems are highly regulated by the federal government. For example, the frequency bands of approximately 5.15-5.25 GHz, 5.25-5.35 GHz, and 5.725-5.825 GHz unlicensed national information structure (U-NII) bands are regulated by Title 47, Section 15.407 of the United States Code of Federal Regulations (CFR). While the CFR specifies certain limitations on the use of radio-frequency networks, other standards committees, such as the Institute of Electrical and Electronics Engineers (IEEE), specify technical requirements for wireless systems to ensure cross-compatibility of wireless systems from different manufacturers. For example, the IEEE "Wireless LAN Medium Access Control (MAC) and Physical Layer (PHY) Specifications: High-Speed Physical Layer in the 5 GHz Band" (hereinafter "the IEEE 5 GHz standard") provides several requirements for systems operating in the 5 GHz band.

One of the requirements set forth in the IEEE 5 GHz standard is an OFDM physical layer convergence procedure (PLCP) sub-layer. Specifically, FIG. 1A shows a Presentation Protocol Data Unit (PPDU) frame in the IEEE 5 GHz standard. As shown in FIG. 1A, the PPDU frame includes a short-training period 110, a long-training period 120 following the short-training period 110, a signaling period 130 following the long-training period 120, and a plurality of data periods 140, 142, 144 that follow the signaling period 130. The long-training period 120, the signaling period 130, and the plurality of data periods 140, 142, 144 include a guard interval (GI) as defined in the IEEE 5 GHz standard.

The short-training period 110 contains ten symbols (e.g., $t_1, t_2 \ldots t_9, t_{10}$), which are used for signal detecting, coarse-frequency acquisition, diversity selection, and other functions as defined by the IEEE 5 GHz standard. Since the short-training period 110 is described in detail in the IEEE 5 GHz standard, further discussion of the short-training period 110 is omitted here.

The long-training period 120 contains a guard interval (GI2) and two long-training symbols, $T_1$ and $T_2$. As specified in the IEEE 5 GHz standard, each of the long-training symbol $T_1$ and $T_2$ consists of 53 sub-carriers including a zero value at DC, which are modulated by elements of sequence X, given by:

$$X = \{1, 1, -1, -1, 1, 1, -1, 1, -1, 1, 1, 1, 1, 1, 1, -1, -1, 1, \quad \text{[Eq. 1]}$$
$$1, -1, 1, 1, 1, 1, 0, 1, -1, -1, 1, 1, -1, 1, -1, 1, -1,$$
$$-1, -1, -1, -1, 1, 1, -1, -1, 1, -1, 1, -1, 1, 1, 1, 1\}.$$

Additionally, the IEEE 5 GHz standard requires that the long-training symbols be generated according to:

$$x(t) = w(t) \sum_{k=0}^{53} X(k) e^{j2\pi(k-26)\Delta_F (t-T_{G12})}, \quad \text{[Eq. 2]}$$

where x(t) is a time-domain representation of the long training symbol; w(t) is a weighting factor for the purpose of spectral shaping; k is a sub-carrier index; X(k) is a coefficient of the training symbol as defined by Eq. 1; and $T_{G/2}$ is the guard interval, which is defined by the IEEE 5 GHz standard as 1.6 μs.

In addition to specifying the content of the long-training symbols according to Eq. 2, the IEEE 5 GHz standard further requires that the number of long-training symbols be two (e.g., $T_1$ and $T_2$), thereby improving the accuracy of channel estimation.

The IEEE 5 GHz standard further dictates that the first long training symbol $T_1$ be identical to the second long training symbol $T_2$. Thus, designating the identical long-training symbols as X, the first long-training symbol X 155 and the second long-training symbol X 165 are transmitted consecutively during the long-training period 120. Hence, for a two-branch transmitter-diversity OFDM system as shown in FIG. 2, a first transmitter 260 transmits:

(1) two long-training symbols X 155a and X 165a across a first channel $H_A$ during the long-training period 120;

(2) signaling information S 170a across the first channel $H_A$ during the signaling period 130; and (3) data $D_1$ 180a and $D_2$ 190a across the first channel $H_A$ for subsequent data periods 140, 142.

Similarly, a second transmitter 265 transmits:

(1) two long-training symbols X 155b and X 165b across a second channel $H_B$ during the long-training period 120;

(2) signaling information S 170b across the second channel $H_B$ during the signaling period 130; and (3) data $D_1$ 180b and $D_2$ 190b across the second channel $H_B$ for subsequent data periods 140, 142.

The transmitted signals are received at a receiver 205 as a function of the transmitted symbol and the channel characteristics. After removing the guard interval, each received symbol is inverse Fourier transformed. Thus, for a two-branch transmitter-diversity OFDM system as shown in FIG. 2, the received frequency domain signals $Y_1$ may be represented as:

$$Y_1 = (H_A \cdot X) + (H_9 \cdot X) + Z_1 \quad \text{[Eq. 3]}.$$

where $Z_1$ represents the received noise, the channel characteristics $H_A$ and $H_B$ are presumed to be time-invariant during the frame duration, and the propagation delay over these two channels are presumed to be substantially the same. Since the same long-training symbol X is transmitted from both branches of the two-branch transmitter-diversity system, Eq. 3 simplifies to:

$$Y_1 = (H_A + H_B) \cdot X + Z_2 \quad \text{[Eq. 4]}.$$

Similarly, the subsequent received data blocks are represented by:

$$Y_2 = (H_A + H_B) \cdot X + Z_2 \quad \text{[Eq. 5]},$$

$$Y_3 = (H_A + H_B) \cdot S + Z_3 \quad \text{[Eq. 6]},$$

$$Y_4 = H_A \cdot D_{A1} + H_B \cdot D_{B1} + Z_4 \quad \text{[Eq. 7]},$$

and:

$$Y_5 = H_A \cdot D_{A2} + H_B \cdot D_{B2} + Z_5 \quad \text{[Eq. 8]}.$$

Eqs. 4 and 5, in the aggregate, result in:

$$(Y_1 + Y_2) \cdot X^* = (H_A + H_B)(2|X|^2) + (Z_1 + Z_2) \cdot X^* \quad \text{[Eq. 9]},$$

which may be re-written as:

$$H_A + H_B = \frac{(Y_1 + Y_2) \cdot X}{2} - \frac{(Z_1 + Z_2)}{2}$$

or, more specifically, as:

$$H_A(k) + H_B(k) = \frac{(Y_1(k) + Y_2(k)) \cdot X(k)}{2} - \frac{(Z_1(k) + Z_2(k))}{2}, k = 1, \cdots, N, \quad \text{[Eq. 10]}$$

where N represents the number of OFDM sub-carriers, and k represents the sub-carrier index Since, as shown in Eq. 1, $X(k) \in \{\pm 1\}$ for all k, the complex coefficient $X^*(k)$ of the transmitted symbol $X(k)$ will be equal to the transmitted symbol $X(k)$. Furthermore, since $X(k) \in \{\pm 1\}$, the square norm $|X(k)|^2$ of the transmitted symbol $X(k)$ will be 1. Additionally, since $X(k) \in \{\pm 1\}$, the statistics of $(Z_1(k)+Z_2(k))X(k)$, without loss of generality, is the same as that of $(Z_1(k)+Z_2(k))$.

By omitting the noise terms, the aggregate effect of both channels $H_C = H_A + H_B$ can be estimated by:

$$H_C(k) \approx \frac{(Y_1(k) + Y_2(k)) \cdot X(k)}{2}, k = 1, \cdots, N, \quad \text{[Eq. 11]}$$

While Eq. 11 provides an avenue for calculating the combined channel characteristics for $H_C$, it is evident that the duplicative transmission of X provides very little assistance in distinguishing channel characteristics of the individual channels $H_A$ and $H_B$. In other words, because two branches $H_A$ and $H_B$ are used for transmitting a single X, a classic one-equation two-unknown system is presented in which only the aggregate characteristics $H_C$ may be calculated to any degree of certainty. Furthermore, while the duplicative transmission of X increases the signal-to-noise ratio (SNR), the increase in SNR provides little help in resolving the characteristics of each individual channel.

Although complex algorithms exist to segregate the individual channel effects from the aggregate channel effect, these algorithms make additional presumptions about the channels in order to properly estimate the characteristics of each channel. Thus, these channel estimation algorithms are only as good as their initial presumptions. Furthermore, due to the complexity of these channel estimation algorithms, when the two-branch transmitter-diversity system is expanded to multiple-branches (e.g., three-branch, four-branch, etc.), the complexity of calculations increases exponentially.

Thus, a heretofore-unaddressed need exists in the industry to address the aforementioned deficiencies and inadequacies.

SUMMARY

The present invention is directed to systems and methods for estimating channel characteristics in OFDM environments with transmitter diversity.

Briefly described, in architecture, one embodiment of the system comprises logic components that are adapted to transmit a training symbol over a first channel during a first period; transmit the training symbol over a second channel during the first period; transmit a complex conjugate of the training symbol over the first channel during a second period; and transmit a negative complex conjugate of the training symbol over the second channel during the second period.

The present disclosure also provides methods for estimating channel characteristics in OFDM environments with transmitter diversity.

In this regard, one embodiment of the method comprises the steps of transmitting a training symbol over a first channel during a first period; transmitting the training symbol over a second channel during the first period; transmitting a complex conjugate of the training symbol over the first channel during a second period; and transmitting a negative complex conjugate of the training symbol over the second channel during the second period.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A and 1B are diagrams illustrating Presentation Protocol Data Unit (PPDU) frame structure in the IEEE 5 GHz standard.

FIGS. 3A and 3B are diagrams illustrating one embodiment of a system for estimating channel characteristics.

DETAILED DESCRIPTION OF THE EMBODIMENTS

Figure 2:
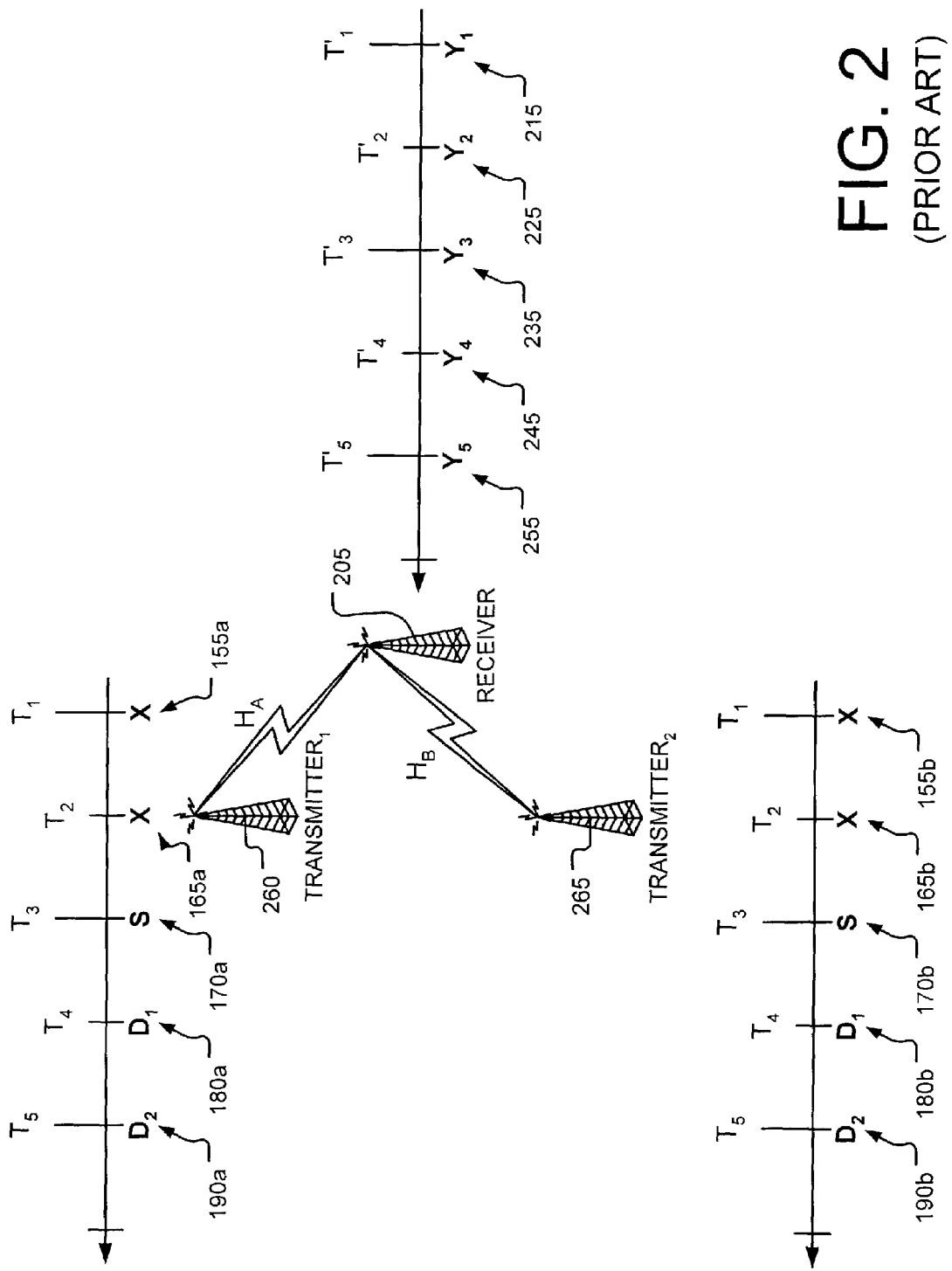
FIG. 2 is a diagram illustrating a two-branch transmitter-diversity OFDM system that operates within the specification of the IEEE 5 GHz standard.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

Several embodiments of the invention are described below, in which additional training symbols may be used to further estimate channel characteristics. Thus, unlike prior systems and methods, which required enormous processing power or additional presumptions about a multi-branch transmitter-diversity system, the embodiments below provide for simpler calculations and fewer presumptions in characterizing multi-branch transmitter-diversity systems.

FIGS. 3A and 3B are diagrams illustrating one embodiment of a system for estimating channel characteristics. FIG. 3A is a diagram showing symbols to be transmitted from a first transmitter, while FIG. 3B is a diagram showing symbols to be transmitted from a second transmitter. FIGS. 3A and 3B show a physical layer convergence procedure (PLCP) preamble field for use in synchronization (SYNC) is shown for one embodiment of the invention. As shown in FIGS. 3A and 3B, the PLCP preamble includes a short-training period 310, a long-training period 320 following the short-training period 310, a signaling period 330 following the long-training period 320, and a plurality of data periods 340, 342, 344 that follow the signaling period 330. The long-training period 320, the signaling period 330, and the plurality of data periods 340, 342, 344 each include a guard interval as defined in the IEEE 5 GHz standard.

Thus, as shown in FIG. 3A, the first transmitter transmits symbols during the short-training period 310 in accordance with the IEEE 5 GHz standard. Once the short-training symbols have been transmitted, long-training symbols X 355a and X 365a are transmitted during the long-training period 320. Here, the capital symbol X denotes a set of the frequency domain quantities in an orthogonal frequency division multiplexing (OFDM) system. Thus, X can be viewed as a vector containing N elements, where N is the number of sub-carriers in the OFDM system. Each element X(k) of X is carried by its corresponding kth sub-carrier. It should be appreciated that X is inverse Fourier transformed to a time domain signal, added with a cyclic prefix, and converted to a radio-frequency (RF) analog signal by an RF module prior to being radiated from a transmit antenna.

The duplicative transmission of X is followed by transmission of signaling information S 370a during the signaling period 330. Upon transmitting the signaling information S 370a, a complex conjugate X* 385a of the long-training symbol is transmitted during a first data period 340. Since, as described above, each element in X is real, it is axiomatic that each element in X* is also real. Additionally, since each element in X is real, it is also axiomatic that X* is identical to X. It should, however, be understood that, outside of the context of the IEEE 5 GHz standard, X need not be wholly real-valued, and that X may contain complex numbers having imaginary components.

Similarly, as shown in FIG. 3B, the second transmitter transmits symbols during the short-training period 310 in accordance with the IEEE 5 GHz standard. Once the short-training symbols have been transmitted, long-training symbols X 355b and X 365b are transmitted during the long-training period 320. The duplicative transmission of X is followed by transmission of signaling information S 370b during the signaling period 330. Upon transmitting the signaling information S 370b, a negative complex conjugate –X 385b of the long-training symbol is transmitted during a first data period 340. Since each element in X is real, each element in –X* is also real. Again, it should be understood that, outside of the context of the IEEE 5 GHz standard, X need not be wholly real-valued and may contain complex numbers having imaginary components. In this regard, if X is generally complex-valued, then the training symbols transmitted during 385a and 385b may be the symbol pairs of (–X, X), (X, –X), (–X*, X*), or (X*, –X*). For simplicity, the description below show non-limiting examples using symbol pairs (–X*, X*) and (X*, –X*).

As described here, rather than merely duplicating the transmission of X, the system of FIGS. 3A and 3B supplements the duplicative transmission of X with X* at the first channel, and supplements the duplicative transmission of X with –X* at the second channel. Several advantages of supplementing the long-training symbols with X* and –X* are described below with reference to FIG. 4.

Figure 4:
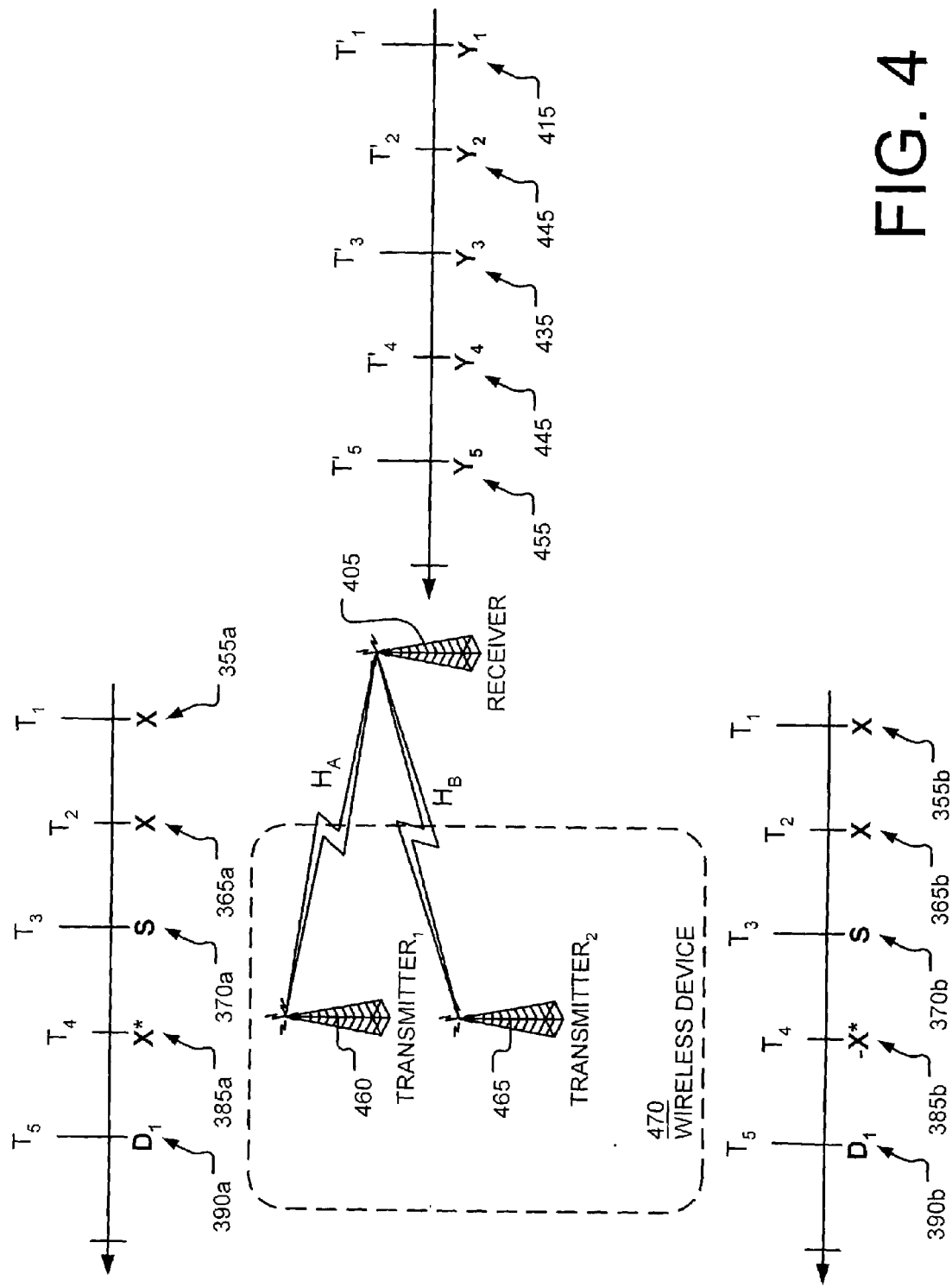
FIG. 4 is a diagram illustrating a two-branch transmitter-diversity OFDM system in which channel characteristics are estimated according to one embodiment of the invention.

FIG. 4 is a diagram illustrating a two-branch transmitter-diversity OFDM system as a wireless device 470 and a receiver 405. The wireless device 470 may be a wireless local area network (LAN) access point unit, a wireless LAN card, a cellular telephone, a wireless personal digital assistant (PDA), a portable computer having wireless transmission capabilities, etc. As shown in FIG. 4, the wireless device 470 comprises two transmitters 460, 465 that are adapted to transmit data in an orthogonal frequency-division multiplexing (OFDM) environment. The receiver 405 is adapted to receive signals from the two transmitters 460, 465. As shown in FIG. 4, a first channel transfer function $H_A$ alters signals that are transmitted from the first transmitter 460 while a second channel transfer function $H_B$ alters signals that are transmitted from the second transmitter 465.

Thus, if the first transmitter 460 and second transmitter 465 transmits X (i.e., inverse Fourier transforms X to generate a time domain signal x, adds a cyclic prefix to generate $x_{cp}$, converts $x_{cp}$ to a radio-frequency (RF) analog signal $X_{RF}$ by an RF module, and radiates $x_{RF}$ at the transmit antenna), then the received symbol $Y_1$ is represented in the frequency domain by:

$$Y_1 = (H_A \cdot X) + (H_B \cdot X) + Z_1 \qquad [\text{Eq. 12}].$$

where $Z_1$ represents the noise for first received symbol. Since the same training symbol X is transmitted from both branches of the two-branch transmitter-diversity system, Eq. 12 may be simplified to:

$$Y_1 = (H_A + H_B) \cdot X + Z_1 \qquad [\text{Eq. 13}].$$

Similarly, since the same training symbol is transmitted again, the second transmission from the two transmitters 460, 465 may be seen as:

$$Y_2 = (H_A + H_B) \cdot X + Z_2 \quad [\text{Eq. 14}].$$

Also, if signaling information 370a is transmitted as a third transmitted symbol $T_3$, then:

$$Y_3 = (H_A + H_B) \cdot S + Z_3 \quad [\text{Eq. 15}],$$

where S represents the frequency-domain signaling information. In one embodiment, upon transmitting the signaling information S, the complex conjugate $X^*$ 385a of the long-training symbol is transmitted from the first transmitter 460 as the fourth symbol $T_4$, and a negative complex conjugate $-X^*$ is transmitted from the second transmitter 465 as the fourth symbol $T_4$. As described above, since X is real, both the complex conjugate $X^*$ and the negative complex conjugate $-X^*$ are real. Additionally, since X is real:

$$X^* = X \quad [\text{Eq. 16}],$$

$$-X^* = -X \quad [\text{Eq. 17}],$$

and:

$$|X(k)|^2 = 1 \quad [\text{Eq. 18}].$$

Thus, in the context of the IEEE 5 GHz standard, the fourth received symbol may be represented as:

$$Y_4 = (H_A \cdot X) + (H_B \cdot (-X)) + Z_4 \quad [\text{Eq. 19}],$$

or simply:

$$Y_4 = (H_A - H_B) \cdot X + Z_4 \quad [\text{Eq. 20}].$$

Combining Eqs. 13 and 20 provides an approach in which $H_A$ and $H_B$ may be isolated. In other words, unlike prior-art approaches in which an aggregate effect $H_C = H_A + H_B$ of the channels is calculated, individual channel characteristics of $H_A$ and $H_B$ may be calculated since:

$$(Y_1 + Y_4) \cdot X^* = ((H_A + H_B) \cdot X + Z_1) \cdot X^* + ((H_A - H_B) \cdot X + Z_4) \cdot X^* \quad [\text{Eq. 21}]$$
$$= 2H_{A'}|X|^2 + (Z_1 + Z_4) \cdot X^*.$$

It should be appreciated that each item in Eq. 21 is a frequency domain representation of an OFDM symbol. From the perspective of the sub-carrier, Eq. 21 may be rewritten as:

$$(Y_1(k) + Y_4(k)) \cdot X(k)^* = 2H_A(k) \cdot |X(k)|^2 + (Z_1(k) + Z_2(k)) \cdot X^*(k), k=1, N \quad [\text{Eq. 22}],$$

where N represents the number of OFDM sub-carriers, and k represents the sub-carrier index.

The channel transfer function $H_A(k)$ may be obtained by:

$$H_A(k) = \frac{(Y_1(k) + Y_4(k)) \cdot X(k)}{2} - \frac{(Z_1(k) + Z_4(k)) \cdot (k)}{2}. \quad [\text{Eq. 23}]$$

Thus, based on Eq. 23, $H_A$ can be estimated as:

$$H_A(k) \approx \frac{(Y_1(k) + Y_4(k)) \cdot X(k)}{2}, k = 1, \cdots, N, \quad [\text{Eq. 24}]$$

or, more simply:

$$H_A \approx \frac{(Y_1 + Y_4) \cdot X}{2}. \quad [\text{Eq. 25}]$$

It should be appreciated that an estimation error proportional to the noise term $(Z_1+Z_4)X/2$ is inherent in Eqs. 24 and 25. Generally, the mean of the estimation error is equal to $E(Z_1+Z_4)/2=0$, where E represents the statistical-expected-value function. Correspondingly, the variance of the estimation error is equal to var $((Z_1+Z_4)X/2)=\text{var}((Z_1+Z_4)/2)=\text{var}((Z_1+Z_4)/2)=\sigma_Z^2/2$, where var() represents the statistical-variance function, and $Z_1$ and $Z_4$ are presumed to have variance $\sigma_z^2$.

The characteristics of the second channel $H_B$ may similarly be obtained using:

$$(Y_1 - Y_4) \cdot X^* = ((H_A + H_B) \cdot X + Z_1) \cdot X^* - ((H_A - H_B) \cdot X + Z_4) \cdot X^* \quad [\text{Eq. 26}]$$
$$= 2H_{B'}|X|^2 + (Z_1 - Z_4) \cdot X^*,$$

or, more simply:

$$H_B = \frac{(Y_1 - Y_4) \cdot X}{2} - \frac{(Z_1 - Z_4) \cdot X}{2}. \quad [\text{Eq. 27}]$$

-continued $$H_B(k) = \frac{(Y_1(k) - Y_4(k)) \cdot X(k)}{2} - \frac{(Z_1(k) - Z_4(k)) \cdot X(k)}{2},$$ [Eq. 28]

$k = 1, \ldots, N.$ or:

Therefore, $H_B$ may be estimated as:

$$H_B \approx \frac{(Y_1 - Y_4) \cdot X}{2}.$$ [Eq. 29]

Similar to Eqs. 24 and 25, an estimation error proportional to the noise term $(Z_1-Z_4)X/2$ is inherent in Eqs. 28 and 29. Thus, the mean of the estimation error is equal to $E((Z_1-Z_4)X/2)=0$, and the variance of the estimation error is equal to $var((Z_1-Z_4)X/2)=var((Z_1-Z_4)/2)=\sigma_z^2/2$.

Thus, as seen from Eqs. 12 through 29, each individual channel may be accurately characterized by transmitting X and $-X^*$ during one of the data periods. Hence, rather than merely characterizing the aggregate of the channels, estimates of each individual channel may be derived from the approach outlined above.

In another embodiment, greater signal integrity and lower estimation error may be achieved by combining Eqs. 13, 14, and 20. Since Eqs. 13 and 14 represent duplicative transmissions of the same training symbol X, combining Eqs. 13 and 14 may be seen as a further signal averaging. Thus, by exploiting the SNR improvement gained by the duplicative transmission of the training symbol X, the channels may be isolated according to:

$$(Y_1+Y_2+2Y_4)X^* = 4 H_A \cdot |X|^2 + (Z_1+Z_2+2Z_4) \cdot X^*$$ [Eq. 30], and:

$$H_A = \frac{(Y_1 + Y_2 + 2Y_4) \cdot X}{4} - \frac{(Z_1 + Z_2 + 2Z_4) \cdot X}{4},$$ [Eq. 31]

or, equivalently:

$$H_A(k) = \frac{(Y(k)_1 + Y_2(k) + 2Y_4(k)) \cdot X(k)}{4} - \frac{(Z_1(k) + Z_2(k) + 2Z_4(k)) \cdot X(k)}{4},$$

$k = 1, \ldots, N,$

Therefore, $H_A$ can be estimated by:

$$H_A(k) \approx \frac{(Y(k)_1 + Y_2(k) + 2Y_4(k)) \cdot X(k)}{4}, k = 1, \ldots, N.$$ [Eq. 33]

Thus, unlike Eqs. 24, 25, 28, and 29, the estimation error induced by the noise term for Eq. 32 is $(Z_1+Z_2+2Z_4)X/4$. Here, the mean of the estimation error is equal to $E((Z_1+Z_2+2Z_4)X/4)=0$, and the variance of the estimation error is equal to $var((Z_1+Z_2+2Z_4)X/4)=var((Z_1+Z_2+2Z_4)/4)=3\sigma_z^2/8$, where $Z_1$, $Z_2$, and $Z_4$ are assumed to have variance $\sigma_z^2$.

As seen from Eq. 32, the variance of the estimation error is reduced, thereby improving the accuracy of estimation. Similarly, the characteristics of the second channel $H_B$ may be obtained by:

$$H_B(k) \approx \frac{(Y_1(k) + Y_2(k) - 2Y_4(k)) \cdot X(k)}{4}, k = 1, \ldots, N,$$ [Eq. 34]

thereby resulting in the mean of the estimation error being equal to $E((Z_1+Z_2-2Z_4)X/4)=0$, and the variance of the estimation error being equal to $var((Z_1+Z_2-2Z_4)X/4)=var((Z_1+Z_2-2Z_4)/4)=3\sigma_z^2/8$, where $Z_1$, $Z_2$, and $Z_4$ are assumed to have variance of $\sigma_z^2/8$, where $Z_1$, $Z_2$, and $Z_4$ are assumed to have variance of $\sigma_z^2$.

In a more general sense, the variance of the estimation error can be further reduced with the transmission of additional long training symbols X or the transmission of additional complex conjugates $X^*$ and negative complex conjugates $-X^*$ of the long training symbol X.

While multiple-branch transmitter-diversity systems have been shown above, another embodiment of the invention may be seen as a method for estimating channel characteristics. Embodiments of such a method is shown in FIGS. 5 and 6.

Figure 5:
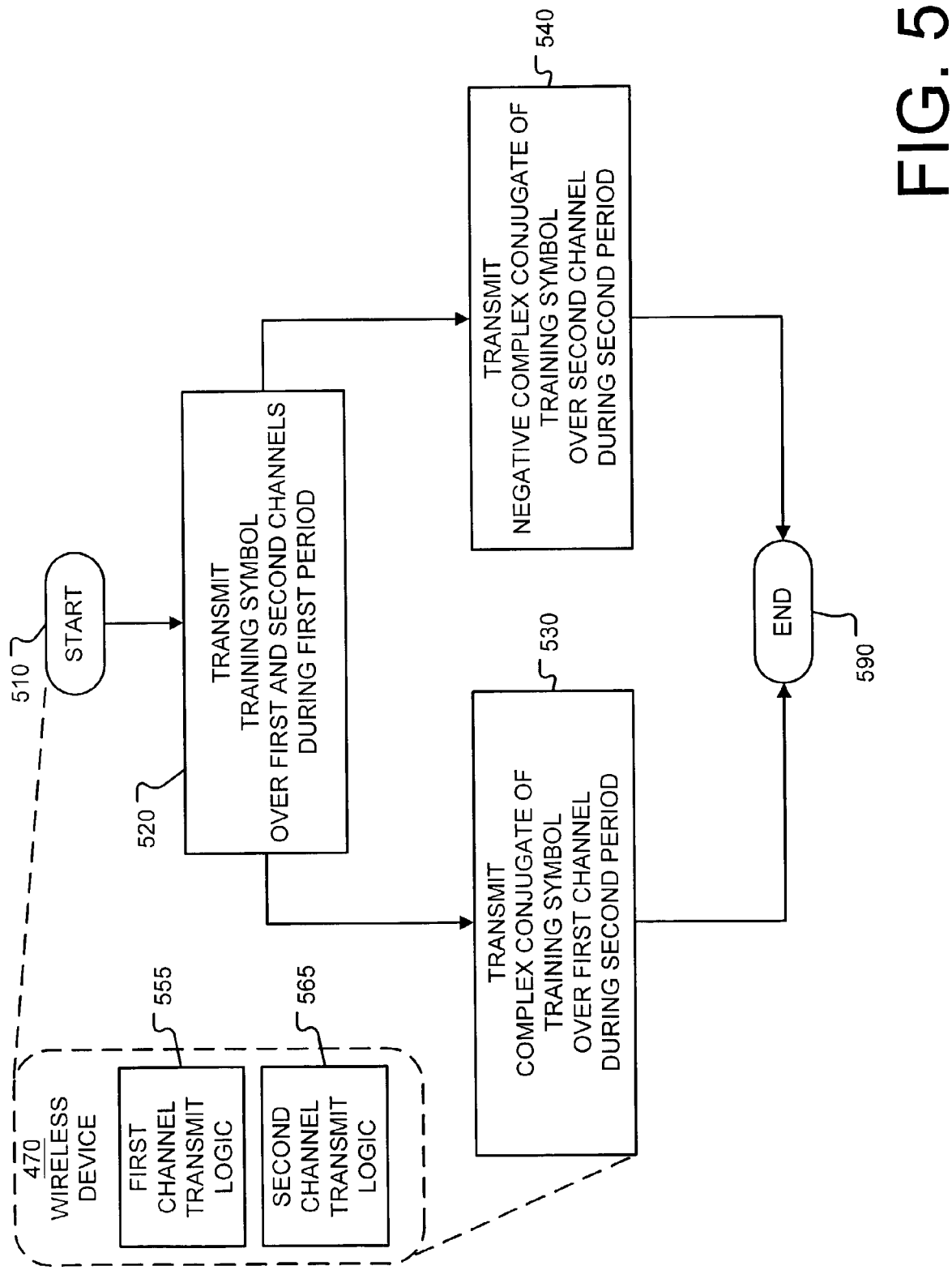
FIG. 5 is a flowchart showing an embodiment of a method for estimating channel characteristics, which is employed by a transmitter in a two-branch transmitter-diversity OFDM system.
Figure 6:
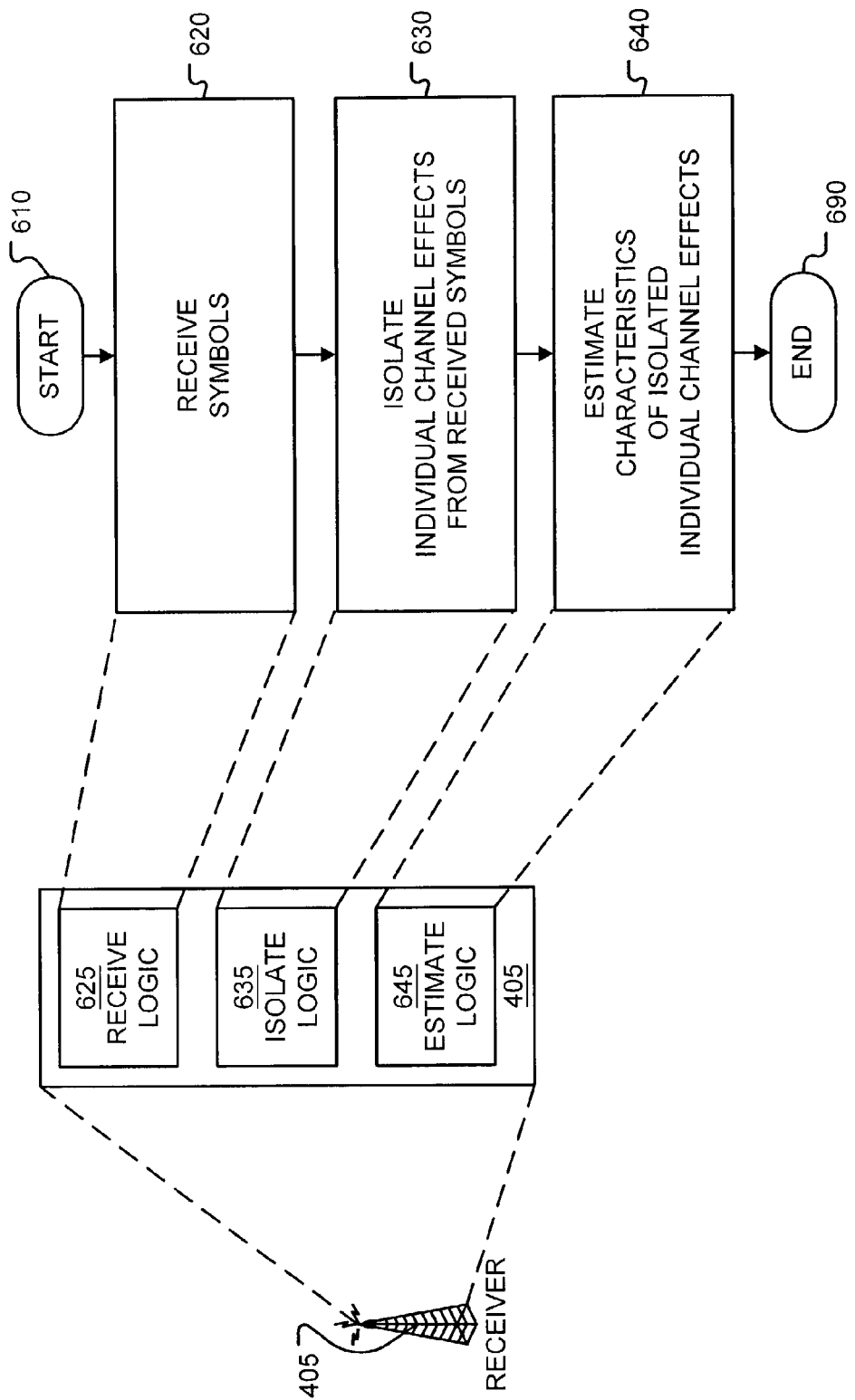
FIG. 6 is a flowchart showing an embodiment of a method for estimating channel characteristics, which is employed by a receiver in a multiple-branch transmitter-diversity OFDM system.

FIG. 5 is a flowchart showing method steps that are performed by the wireless device 470 in a two-branch transmitter-diversity OFDM system. If the signal transmission follows the IEEE standard, then the transmission of the signals during the guard interval is implicit in the embodiment of FIG. 5. As shown in FIG. 5, a training symbol is transmitted (520) over both the first and second channels during a first period. In one embodiment, the wireless device 470 comprises first channel transmit logic 555 and second channel transmit logic 565, which are adapted to transmit information over the first and second channels, respectively. After transmitting (520) the training symbol during the first period, a complex conjugate of the training symbol is transmitted (530) over the first channel during a second period. Substantially simultaneously, during the second period, a negative complex conjugate of the training symbol is transmitted (540) over the second channel.

[Eq. 32]

If the channel estimation is performed in accordance with the IEEE 5 GHz standard, then the first period is one of the long-training periods in the preamble of the physical layer convergence procedure (PLCP), and the second period is one of the subsequent data periods. FIG. 6 is a flowchart showing a method for estimating channel characteristics, which is performed by the receiver 405. As shown in FIG. 6, the symbols are received (620) at a receiver 405. Upon receiving (620) the symbols, individual channel effects are isolated (630) from the received symbols. These isolated (630) individual channel effects are used to estimate (640) characteristics of the individual channels. In one embodiment, the receiver 405 comprises receive logic 625, isolate logic 635, and estimate logic 645, which are adapted to perform the receiving (620), isolating (630), and estimating (640) steps, respectively, as shown in FIG. 6. Also, in an example embodiment, the received symbols may be analogous counterparts to the transmitted signals as shown in FIG. 5. Thus, for an n-branch transmitter-diversity system, the receiver 405 receives (620) n symbols, each of which has a different permutation of training symbols to form a true n-equation n-unknown system, thereby permitting isolation of each channel as described with reference to Eqs. 12 through 34.

As seen from FIGS. 5 and 6, the embodiments of the method permit more accurate estimates of the individual channel characteristics, rather than merely estimating the aggregate characteristics of the channel, or making additional presumptions that affect the channel characteristics.

Although exemplary embodiments have been shown and described, it will be clear to those of ordinary skill in the art that a number of changes, modifications, or alterations to the invention as described may be made. For example, while a two-branch transmitter-diversity system has been shown for purposes of illustration, it will be clear to one of ordinary skill in the art that the disclosed approach may be extended to multiple-branch transmitter-diversity systems having three, four, or more branches. Additionally, while FIG. 4 simply shows antennas in a wireless device 470, it will be clear to one of ordinary skill in the art that the transmitters may be a part of a wireless LAN access point unit, a wireless LAN card, a cellular telephone, a wireless personal digital assistant (PDA), or other similar wireless devices that are adapted to transmit and receive data. Furthermore, while one embodiment of the invention shows an additional training symbol being transmitted during the time period allotted for $D_1$, it will be clear to one of ordinary skill in the art that the additional training symbol may also be transmitted during any of the subsequent data periods. Also, while only one additional training symbol (e.g., the complex conjugate of the long-training symbol, the negative complex conjugate of the long training symbol, etc.) is shown in FIGS. 3A and 3B, it will be clear to one of ordinary skill in the art that additional training symbols may be transmitted to increase the signal-to-noise ratio in channel estimation, or, additionally, to characterize multiple-branch transmitter-diversity systems having more than two branches. Also, while several embodiments of the invention are described within the framework of the IEEE 5 GHz standard, it will be clear to one of ordinary skill in the art that the methods and systems described herein may be extended to any environment in which orthogonal frequency-division multiplexing (OFDM) is used. Additionally, while the IEEE 5 GHz standard is used to more clearly describe several aspects of the invention, it should be understood that the systems and methods described above are compatible with the IEEE 2.4 GHz standard (IEEE 802.11g) or other similar wireless standards, regardless of the operating frequency band. These, and other such changes, modifications, and alterations, should therefore be seen as being within the scope of the disclosure.

What is claimed is:

1. In a two-branch transmitter diversity wireless-communication system employing orthogonal frequency-division multiplexing, a method comprising:
    transmitting a long-training symbol over a first channel during a long-training period, the long-training period being compliant with the Institute of Electrical and Electronics Engineers (IEEE) "Wireless Local Area Network (LAN) Medium Access Control (MAC) and Physical Layer (PHY) Specification";
    transmitting the long-training symbol over a second channel during the long-training period; transmitting a complex conjugate of the long-training symbol over the first channel during a data period;
    transmitting a negative complex conjugate of the long-training symbol over the second channel during the data period;
    receiving the long-training symbols, the complex conjugate of the long-training symbol, and the negative complex conjugate of the long-training symbol; and
    extracting channel characteristics from the received long-training symbols, the complex conjugate of the long-training symbol, and the negative complex conjugate of the long-training symbol.

2. A method for estimating channel characteristics comprising:
    transmitting a training symbol over a first channel during a first period;
    transmitting the training symbol over a second channel during the first period;
    transmitting a complex conjugate of the training symbol over the first channel during a second period;
    transmitting a negative complex conjugate of the training symbol over the second channel during the second period;
    receiving the training symbols, the complex conjugate of the training symbol, and the negative complex conjugate of the training symbol over the first and second channels; and
    estimating the first and second channels based on the received training symbols, the complex and negative complex conjugates of the training symbol;
wherein:
    the frame is a physical layer convergence procedure (PLCP);
    the preamble comprises a short-training period, a long-training period and a signaling period; and
    the transmitting the training symbol over the first channel during the first period comprises transmitting the training symbol over the first channel during the long-training period.

3. The method of claim 2, further comprising re-transmitting the training symbol over the first channel during the long-training period.

4. The method of claim 2, wherein the transmitting the training symbol over the second channel during the first period comprises: transmitting the training symbol over the second channel during the long-training period.

5. The method of claim 4, further comprising: re-transmitting the training symbol over the second channel during the long-training period.

6. The method of claim 2, wherein the transmitting the complex conjugate of the training symbol over the first channel during the second period comprises: transmitting the complex conjugate of the training symbol over the first channel during a data period of the frame.

7. The method of claim 2, wherein the transmitting the negative complex conjugate of the training symbol over the second channel during the second period comprises: transmitting the negative complex conjugate of the training symbol over the second channel during a data period of the frame.

8. The method of claim 2, further comprising: transmitting additional training symbols over the first channel during other periods not within the preamble.

9. The method of claim 8, wherein the number of other periods is proportional to a number of channels.

10. The method of claim 2, further comprising: transmitting additional training symbols over the second channel during other periods not within the preamble.

* * * * *